(12) United States Patent
Newman et al.

(10) Patent No.: US 10,070,101 B2
(45) Date of Patent: Sep. 4, 2018

(54) LOCALISING TRANSPORTABLE APPARATUS

(71) Applicant: The Chancellor Masters and Scholars of The University of Oxford, Oxford, Oxfordshire (GB)

(72) Inventors: Paul Michael Newman, Oxfordshire (GB); Alexander Douglas Stewart, Oxfordshire (GB)

(73) Assignee: The Chancellor Masters and Scholars of The University of Oxford, Oxford (GB)

( * ) Notice: Subject to any disclaimer, the term of this patent is extended or adjusted under 35 U.S.C. 154(b) by 624 days.

(21) Appl. No.: 14/348,451

(22) PCT Filed: Sep. 27, 2012

(86) PCT No.: PCT/GB2012/052398
§ 371 (c)(1),
(2) Date: Mar. 28, 2014

(87) PCT Pub. No.: WO2013/045932
PCT Pub. Date: Apr. 4, 2013

(65) Prior Publication Data
US 2014/0240501 A1    Aug. 28, 2014

(30) Foreign Application Priority Data
Sep. 30, 2011    (GB) .................... 1116960.4

(51) Int. Cl.
*G06T 7/77*    (2017.01)
*H04N 7/18*    (2006.01)
(Continued)

(52) U.S. Cl.
CPC ............... *H04N 7/183* (2013.01); *G06T 7/74* (2017.01); *G06T 7/77* (2017.01);
(Continued)

(58) Field of Classification Search
CPC .......... G06T 17/05; G06T 2207/30252; G06T 7/2053; G06T 7/0028; G06T 7/0081; G06T 7/0065
See application file for complete search history.

(56) References Cited

U.S. PATENT DOCUMENTS

| | | | |
|---|---|---|---|
| 5,517,419 A | 5/1996 | Lanckton et al. | |
| 6,194,860 B1 | 2/2001 | Seelinger et al. | |
| (Continued) | | | |

FOREIGN PATENT DOCUMENTS

| | | | | |
|---|---|---|---|---|
| EP | 1916828 A1 * | 4/2008 | ........ | H04M 1/72569 |
| GB | 20162014 A | 1/1986 | | |
| (Continued) | | | | |

OTHER PUBLICATIONS

Levinson et al., "Robust Vehicle Localization in Urban Environments Using Probabilitic Maps", Stanford University, 2010 IEEE International Conference on Robotics and Automation, May 2010, pp. 4372-4378, 7 pages.
(Continued)

*Primary Examiner* — Obafemi Sosanya
(74) *Attorney, Agent, or Firm* — Finch & Maloney PLLC

(57) ABSTRACT

Method and apparatus for localizing transportable apparatus (100) within an environment (120) includes obtaining (202) point cloud data (114) representing a 3D point cloud with appearance information of at least part of the environment. The method further obtains (204) first frame data (110) representing an image produced by a sensor (102) onboard transportable apparatus at a first time and location within the environment and second frame data (110) representing an image produced by the sensor at a second time and location within the environment. The method harmonizes (206) information about the first frame data, the second frame data and an overlapping subset of the point cloud data in order to determine a location within the point cloud data where at (Continued)

least one of the first frame and the second frame was produced, thereby localizing (208) the transportable apparatus within the environment.

20 Claims, 12 Drawing Sheets

(51) Int. Cl.
  *G06T 7/73* (2017.01)
  *G06T 7/11* (2017.01)
  *G06T 7/254* (2017.01)
(52) U.S. Cl.
  CPC .............. *G06T 2207/10016* (2013.01); *G06T 2207/10028* (2013.01); *G06T 2207/30252* (2013.01)

(56) References Cited

U.S. PATENT DOCUMENTS

| | | | |
|---|---|---|---|
| 6,750,873 B1* | 6/2004 | Bernardini | G06T 15/04 345/581 |
| 7,693,654 B1 | 4/2010 | Dietsch et al. | |
| 8,290,305 B2 | 10/2012 | Minear et al. | |
| 8,447,474 B2 | 5/2013 | Breed | |
| 8,478,642 B2 | 7/2013 | Dey et al. | |
| 8,626,392 B2 | 1/2014 | Kojo | |
| 2007/0071311 A1 | 3/2007 | Rovira-Mas et al. | |
| 2008/0033645 A1 | 2/2008 | Levinson et al. | |
| 2008/0112610 A1* | 5/2008 | Israelsen | G06T 17/00 382/154 |
| 2009/0005961 A1 | 1/2009 | Grabowski et al. | |
| 2009/0076655 A1 | 3/2009 | Blondel et al. | |
| 2010/0013615 A1 | 1/2010 | Hebert et al. | |
| 2010/0106356 A1 | 4/2010 | Trepagnier et al. | |
| 2010/0106603 A1 | 4/2010 | Dey et al. | |
| 2010/0114416 A1 | 5/2010 | Au et al. | |
| 2010/0121577 A1 | 5/2010 | Zhang et al. | |
| 2010/0183192 A1* | 7/2010 | Fritsch | G06T 7/254 382/103 |
| 2010/0245573 A1 | 9/2010 | Gomi et al. | |
| 2010/0253593 A1 | 10/2010 | Seder et al. | |
| 2011/0123135 A1 | 5/2011 | Hsieh et al. | |
| 2011/0164037 A1* | 7/2011 | Yoshida | G06T 15/08 345/419 |
| 2011/0205338 A1 | 8/2011 | Choi et al. | |
| 2012/0020528 A1* | 1/2012 | Yamada | G06T 7/11 382/106 |
| 2012/0050525 A1* | 3/2012 | Rinner | G06T 7/0028 348/117 |
| 2012/0123642 A1 | 5/2012 | Kojo | |
| 2012/0203431 A1 | 8/2012 | Kojo et al. | |
| 2012/0218125 A1 | 8/2012 | Demirdjian et al. | |
| 2013/0120578 A1 | 5/2013 | Iga et al. | |
| 2013/0162829 A1 | 6/2013 | Kadowaki et al. | |
| 2014/0233010 A1 | 8/2014 | Baldwin et al. | |
| 2014/0240690 A1 | 8/2014 | Newman et al. | |
| 2014/0249752 A1 | 9/2014 | Napier et al. | |

FOREIGN PATENT DOCUMENTS

| | | |
|---|---|---|
| WO | 2013045917 A1 | 4/2013 |
| WO | 2013045927 A1 | 4/2013 |
| WO | 2013045932 A1 | 4/2013 |
| WO | 2013045935 A1 | 4/2013 |

OTHER PUBLICATIONS

Glennie et al., "Static Calibration and Analysis of the Velodyne HDL-64E S2 for High Accuracy Mobile Scanning", Remote Sensing, 2, 1610-1624; doi: 10.3390/rs 2061610, 15 Pages.

Harrison et al., "TICSync: Knowing When Things Happened", 2011 IEEE International Conference on Robotics and Automation, May 2011, pp. 356-363, 8 pages.

International Preliminary Report on Patentability received for Patent Application No. PCT/GB2012/052381, dated Apr. 10, 2014, 11 pages.

International Search Report and Written Opinion of The International Searching Authority received for Patent Application No. PCT/GB2012/052381, dated Dec. 12, 2012, 17 pages.

GB Intellectual Property Office Search Report under Section 17(5) received for GB Patent Application No. 1116959.6 dated Jan. 24, 2012, 3 pages.

Tomasi, et al., "Shape and Motion from Image Streams Under Orthography: A Factorization Method," International Journal of Computer Vision, Kluwer Academic Publishers, Norwell, US, vol. 9, No. 2, Nov. 1, 1992, pp. 137-154.

Cole, et al., "Using Laser Range Data for 3D SLAM in Outdoor Environments," IEEE International Conference on Robotics and Automation, Orlando, Florida, May 15-19, 2006, pp. 1556-1563.

Moosmann, et al., "Velodyne SLAM," IEEE Intelligent Vehicles Symposium (IV), Baden-Baden, Germany, Jun. 5-9, 2011, pp. 393-398.

Baldwin, et al., "Road vehicle localization with 2D push-broom LIDAR and 3D priors," IEEE International Conference on Robotics and Automation, RiverCentre, Saint Paul, Minnesota, May 14-18, 2012, pp. 2611-2617.

Segvic, et al., "A mapping and localization framework for scalable appearance-based navigation," Computer Vision and Image Understanding, Academic Press, US, vol. 113, No. 2, Feb. 1, 2009, pp. 172-187.

Scaramuzza, et al., "Exploiting Motion Priors in Visual Odometry for Vehicle-Mounted Cameras with Non-holonomic Constraints," IEEE/RSJ International Conference on Intelligent Robots and Systems, Sep. 25-30, 2011, 8 pages.

Weste, et al., "Dynamic Time Warp Pattern Matching Using an Integrated Multiprocessing Array," IEEE Transactions on Computers, vol. C-32, No. 8, Aug. 1, 1983, pp. 731-744.

International Preliminary Report on Patentability received for Patent Application No. PCT/GB2012/052393, dated Apr. 10, 2014, 8 pages.

International Search Report and Written Opinion of the International Searching Authority received for Patent Application No. PCT/GB2012/052393, dated Jan. 3, 2013, 12 pages.

GB Intellectual Property Office Search Report under Section 17(5) received for GB Patent Application No. 1116961.2 dated Mar. 22, 2012, 3 pages.

Jordt, et al., "Automatic High-Precision Self-Calibration of Camera-Robot Systems," IEEE International Conference on Robotics and Automation, Kobe, Japan—May 12-17, 2009, pp. 1244-1249.

Underwood, et al., "Error Modeling and Calibration of Exteroceptive Sensors for Accurate Mapping Applications," Journal of Field Robotics, vol. 27, No. 1., Jan. 1, 2010, pp. 2-20.

Sheehan, et al., "Automatic Self-Calibration of a Full Field-Of-View 3D n-Laser Scanner," International Symposium on Experimental Robotics, Delhi, India, Dec. 18, 2010, 14 pages.

Saez, et al., "Underwater 3d SLAM through Entropy Minimization," IEEE International Conference on Robotics and Automation, Orlando, Florida—May 15-19, 2006, pp. 3562-2567.

International Preliminary Report on Patentability received for Patent Application No. PCT/GB20121052402, dated Apr. 10, 2014, 8 pages.

International Search Report and Written Opinion of the International Searching Authority received for Patent Application No. PCT/GB2012/052402, dated Dec. 6, 2012, 12 pages.

GB Intellectual Property Office Search Report under Section 17(5) received for GB Patent Application No. 1116958.8, dated Dec. 15, 2011, 3 pages.

Furgale et al., "Visual Teach and Repeat for Long-Range Rover Autonomy," Journal of Field Robotics, vol. 27, No. 5, Sep. 1, 2010, pp. 534-535.

Lategahn, et al., "Visual SLAM for Autonomous Ground Vehicles," IEEE International Conference on Robotics and Automation, May 9-13, 2011, 6 pages.

(56) References Cited

OTHER PUBLICATIONS

Royer et al., "Monocular Vision for Mobile Robot Localization and Autonomous Navigation," International Journal of Computer Vision, Kluwer Academic Publishers, BO, vol. 74, No. 3, Jan. 13, 2007, pp. 237-260.

International Search Report and Written Opinion of The International Searching Authority received for Patent Application No. PCT/GB2012/052398, dated Dec. 6, 2012, 13 pages.

GB Intellectual Property Office Search Report under Section 17(5) received for GB Patent Application No. 1116960.4 dated Jul. 6, 2012, 3 pages.

Stewart, et al., "LAPS-Localisation using Appearance of Prior Structure: 6DoF Monocular Camera Localisation using Prior Pointclouds," IEEE International Conference on Robotics and Automation, RiverCentre, Saint Paul, Minnesota, May 14-18, 2012, pp. 2625-2632.

Viola, et al., "Alignment by Maximization of Mutual Information," International Journal of Computer Vision, Kluwer Academic Publishers, vol. 24, No. 2, Sep. 1, 1997, pp. 137-154.

Wulf, et al., "Robust Self-Localization in Industrial Environments based on 3D Ceiling Structures," IEEE International Conference on Intelligent Robots and Systems, Oct. 9-15, 2006, Beijing, China, pp. 1530-1534.

International Preliminary Report on Patentability received for Patent Application No. PCT/GB2012/052398, dated Apr. 10, 2014, 8 pages.

Spoerri, Anselm, "Novel Route Guidance Displays", Department of Civil Engineering, Massachusetts Institute of Technology, IEEE Vehicle Navigation & Information Systems Conference, Oct. 1993, Ottawa, Canada 0-7803-1235-X93, pp. 419-422, 4 pages.

Scott-Young, Stephen, "Seeing the Road Ahead: GPS-Augmented Reality Aids Drivers", The University of Melbourne, GPS World Magazine, Nov. 1, 2003, vol. 14, Issue No. 11, Advanstar Communications, Inc., Accession No. 00968694, 2 pages.

* cited by examiner

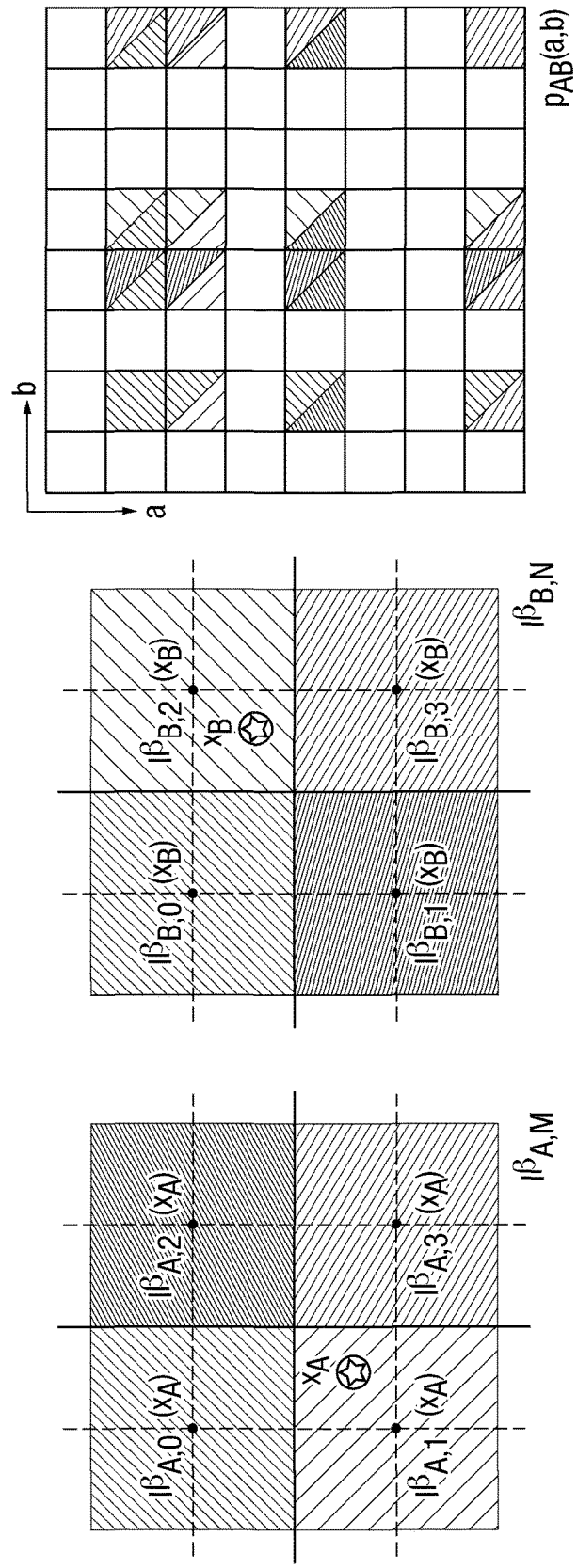

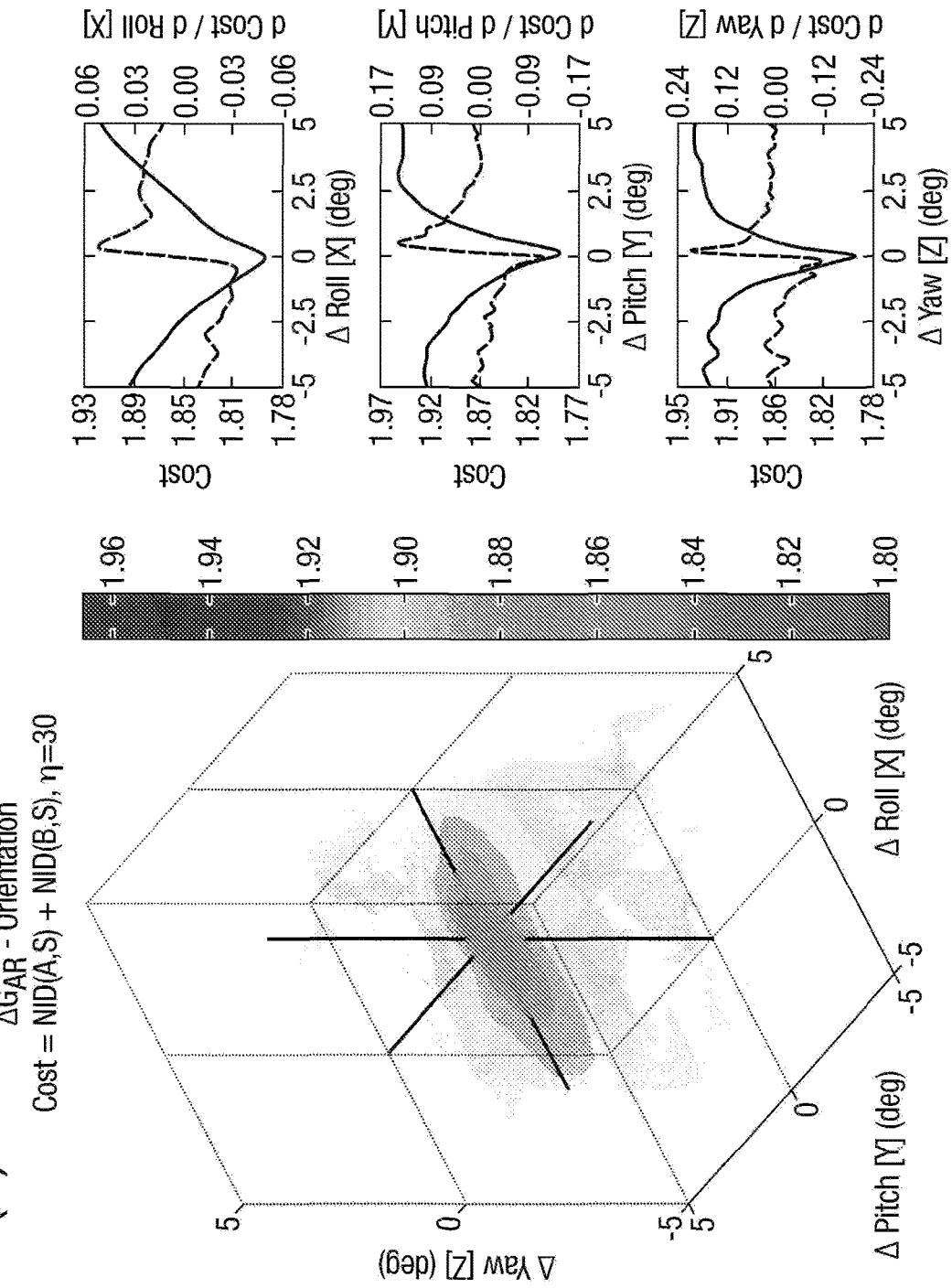

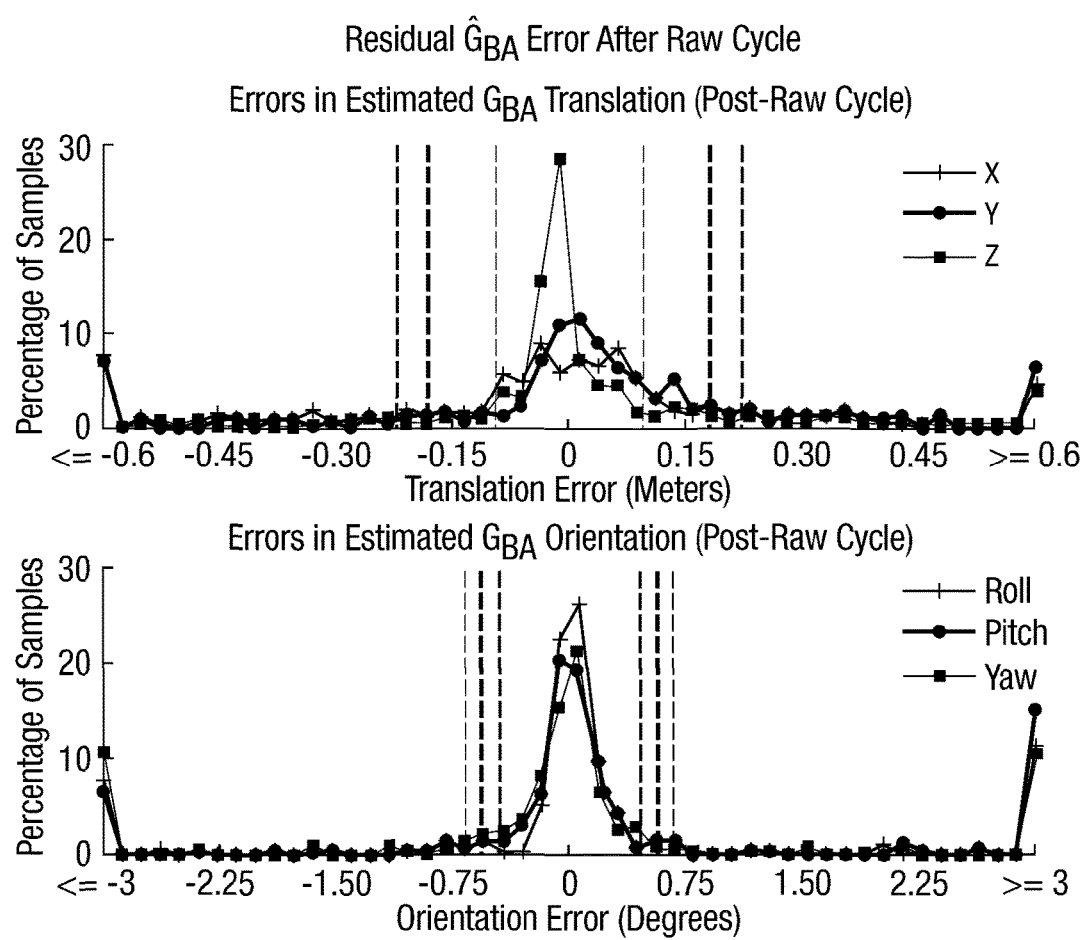

LOCALISING TRANSPORTABLE APPARATUS

The present invention relates to improvements in localising transportable apparatus within an environment.

It is desirable to precisely localise a vehicle in an environment, which can assist with goals, such as autonomy. Accurate localisation conventionally requires a 3D map of the environment, which requires an expensive 3D laser to generate, typically in combination with Differential Global Positioning System (DGPS) or integrated inertial systems. It is not always feasible from a cost perspective to include such complex components in vehicles and there can also be problems related to the operating envelope of such systems, particularly in areas deprived of good DGPS reception.

Known solutions to the localisation problem include use of Simultaneous Localisation and Mapping (SLAM). An example of a 'direct' SLAM approach is given in G. Silveira, E. Malis, and P. Rives, "An efficient direct approach to visual SLAM," Robotics, IEEE Transactions on, vol. 24, no. 5, pp. 969-979, 2008, which involves a proposal to minimise a function of the difference in pixel intensities between a warped reference image patch and the currently observed image. In that paper, multiple planar patches were tracked and their corresponding homographies estimated by minimisation of the L2 norm of pixel intensity differences.

Another known work, A. Comport, E. Malis, and P. Rives, "Real-time Quadrifocal Visual Odometry," The International Journal of Robotics Research, vol. 29, no. 2-3, p. 245, 2010, utilises a direct approach to the problem of visual odometry using a stereo camera, the disparities from which are used via quadrifocal geometry to warp the reference images from the stereo camera prior to comparison with the current images. This known approach allows for the accurate and tractable warping of complex scene geometries not feasible by planar homographies. The cost function minimised is again the $L_2$ norm, but with a robust Huber kernel.

In another piece of known work, R. Newcombe, S. Lovegrove, and A. Davison, "DTAM: Dense tracking and mapping in real-time," in Computer Vision, 2011. ICCV 2011. IEEE International Conference on, 2011, DTAM (Direct Tracking and Mapping), an image feed is used in parallel to both estimate the 3D structure of the local scene and localise the camera within the scene. The latter is achieved by minimising the $L_2$ norm of the photometric error between the current image and a synthesised view of the estimated 3D environment model from a hypothesised camera position. However, currently no external prior information is used in DTAM and the type and scale of the environment considered: indoors and near-field; is very different to outdoor localisation of a moving vehicle at highway speeds over large temporal (seasonal) and physical (city) scales.

Embodiments of the present invention are intended to address at least some of the problems discussed above.

Some embodiments of the invention can perform pose estimation using monocular cameras with a 3D laser point cloud as a workspace prior. Suitable applications include autonomous transport systems in which low cost vehicles equipped with monocular cameras are furnished with pre-processed 3D LIDAR workspaces surveys. The cross-modal approach of some embodiments offers robustness to changes in scene lighting and is computationally cheap. Embodiments perform inference of camera motion by minimisation of the Normalised Information Distance (NID) between the appearance of 3D LIDAR data reprojected into overlapping images. Embodiments can perform localisation against a prior map using only monocular cameras with no locally sensed range information, rather than visual-odometry using only locally sensed range information.

The present inventors were motivated by the expectation that practical systems for localisation, e.g. future autonomous passenger vehicle navigation, will be able to make extensive use of prior information gathered from multiple sources using multiple modalities; such as that available from Google Street View™. Embodiments of the present invention can be based on the assumption that such prior information will be available during live operation, that its coverage will increase to cover the vast majority of areas in which passenger vehicles will operate and that it can be pre-processed offline to improve its utility for the task at hand (navigation in this case). These assumptions are both feasible and reasonable, given the already prevalent coverage of services such as Google Street View™, mobile data networks and the rapid decline in cost and increase in capabilities of cloud computing and data storage. Mass-production may reduce the cost of large, multi-modality sensor arrays such as those used in the DARPA Urban Challenge to the point where they would be cost-effective for passenger vehicles. However, the model used by Google Street View™, whereby a small number of survey vehicles are equipped with expensive sensor arrays and then used extensively to map the environment seems significantly more efficient, as it should result in reduced sensor requirements and thus costs, for subsequent vehicles.

Embodiments of the present invention can provide a new localisation system suitable for long-term autonomy of passenger vehicles or the like with the following requirements:

Real-time, robust & accurate estimation of 6-Degrees of Freedom (DoF) pose relative to the prior information reference frame Use of incrementally updatable, pre-processed prior information suitable for online use Robustness to large changes in environmental conditions (day/night/rain, etc.)

Use of low-cost sensors

According to a first aspect of the present invention there is provided a method of localising transportable apparatus within an environment, the method including or comprising:

obtaining point cloud data representing a 3D point cloud with appearance information of at least part of the environment;

obtaining first frame data representing an image produced by a sensor on board transportable apparatus at a first time and location within the environment;

obtaining second frame data representing an image produced by the sensor at a second time and location within the environment, and harmonising information about the first frame data, the second frame data and an overlapping subset of the point cloud data in order to determine a location within the point cloud data where at least one of the first frame and the second frame was produced, thereby localising the transportable apparatus within the environment.

The step of harmonising the information may be performed by finding a minimum of a cost function that maximises similarity of information about appearance of parts of the environment in the first frame data, the second frame data and the overlapping subset of the point cloud data. The cost function may comprise a Normalised Information Distance (NID) function. The step of harmonising the information may include modelling the appearance of points in the first frame data, the second frame data and/or the overlapping subset of the point cloud data as samples from random variables (which may be discrete random variables) so that the NID cost function can produce a measure of similarity between distributions of the variables.

The first frame data and the second frame data may comprise consecutive images taken over a period of time.

The appearance information may comprise colour values for points in the 3D point cloud.

In some embodiments, there may be a plurality of sensors on board the transportable apparatus and the method may include aligning image data produced by the plurality of cameras and computing the NID cost function between consecutive frames for each said sensor independently and then summing the cost function over all the sensors to produce a total cost function. The method may include blurring the images prior to the alignment.

The point cloud data may be generated during a prior survey of the environment.

The sensor may comprise a monocular camera.

According to another aspect of the present invention there is provided a method of localising a robot equipped with a monocular camera moving through a previously gathered 3D LIDAR point cloud in a workspace, the method including steps of:

harmonising both the locally viewed appearance of the workspace between consecutive frames and the local appearance of the workspace relative to an appearance prior point cloud.

A normalised information distance may be used as a cost function to compare distributions over appearance for common subsets of the workspace. The comparison of distributions may be carried out in real time during movement of the robot through the workspace.

According to another aspect of the present invention there is provided transportable apparatus including or comprising:

a device configured to obtain point cloud data representing a 3D point cloud with appearance information of at least part of the environment;

a sensor configured to obtain first frame data representing an image at a first time and location within the environment and second frame data representing an image produced by the sensor at a second time and location within the environment, and a device configured to harmonise information about the first frame data, the second frame data and an overlapping subset of the point cloud data in order to determine a location within the point cloud data where at least one of the first frame and the second frame was produced, thereby localising the transportable apparatus within the environment.

According to yet another aspect of the present invention there is provided a vehicle including apparatus substantially as described herein.

According to other aspects of the present invention there are provided computer program elements comprising: computer code means to make the computer execute methods substantially as described herein. The element may comprise a computer program product.

According to other aspects of the present invention there is provided apparatus including a processor configured to execute methods substantially as described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which:

FIG. 6 illustrates schematically B-Spline interpolation histogram updates;

FIGS. 8a-8h relate to experimental results, and

FIGS. 9a-9i also relate to experimental results.

Figure 1:
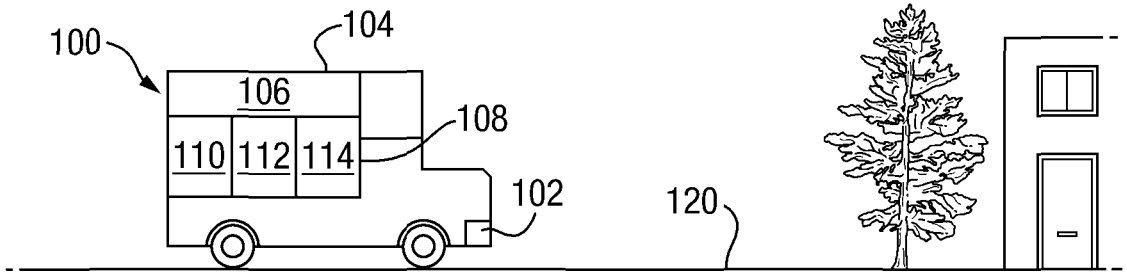
FIG. 1 is a schematic illustration of transportable apparatus within an environment.

FIG. 1 shows schematically transportable apparatus in the form of a vehicle 100 that is fitted with a sensor 102 capable of providing image or video data. In the illustrated embodiment the sensor is a Point Grey Bumblebee2 monochrome stereo camera and in one embodiment of the method only the images from the left camera are used. However, it will be understood that any device capable of generating image data, preferably time-stamped, can be used. The image data need not necessarily be conventional (colour, monochrome or grey-scale) images generated in day/ambient light; alternative embodiments can use additional light-sources or flashes, the images could be infra-red images, hyper-spectral imagery, etc.

The vehicle 100 further includes a computing device 104 having a processor 106 and memory 108. In some embodiments, the computing device may comprise a Graphics Processing Unit (GPU). The computing device is in communication with the sensor 102 (via a wireless or wireless communications interface) and is capable of storing data 110 relating to images received from the sensor using an application 112. The memory 108 further includes existing map data 114 that normally comprises a 3D point cloud of an environment. Typically, the existing map data will have been generated using data collected by at least one previous survey of the environment using, e.g. a survey vehicle equipped with at least one sensor, such as a roof-mounted 3D LIDAR, high-resolution cameras and a high-quality INS (Inertial Navigation System). The skilled person will be familiar with techniques for building a 3D point cloud model of the world based on such survey data. At least some of the existing map data may be retrieved from an external source over a communications network.

The computing device 104 can further include other conventional features, such as a user interface and a communications interface that allows it to exchange data with remote devices. In alternative embodiments, data from the sensor 102 may be transferred to a remote computing device for processing rather than being processed by an on board computing device, with the output of that processing being transferred to the vehicle 100 for use in navigating it or the like.

In use, the vehicle 100 travels through the surrounding environment 120 and the sensor 102 captures image data relating to the scene/environment around the vehicle. Although the example vehicle is a land-based vehicle travelling along a road/ground surface, it will be appreciated that in alternative embodiments, the vehicle could be any type of vehicle that may be travelling through any kind of conventional indoor/outdoor environment. Further, in other embodiments, the sensor and the computing device need not be fitted to/on a vehicle, but can be included in a hand-held navigation device, for example.

The application 112 is configured to process data received from the sensor 102 in order to attempt to localise the vehicle 100 within the environment in conjunction with the existing map data 114. The localisation problem is formulated herein as an optimisation over the pose of the vehicle 100 to harmonise the locally observed appearance of known 3D structure gathered previously and available in the form of the 3D point cloud data 114. The method aims to localise the appearance of known 3D points in the world as viewed from the vehicle so that they are approximately constant as the vehicle moves past them. The vehicle is assumed to be operating wholly within the mapped area and to be equipped with at least one low cost camera. Embodiments of the method make no assumptions about the external conditions during the traversal relative to those of the survey vehicle, nor any assumptions about the specific sensor configuration used by the vehicle 100 relative to that used by the survey vehicle(s).

Figure 2:
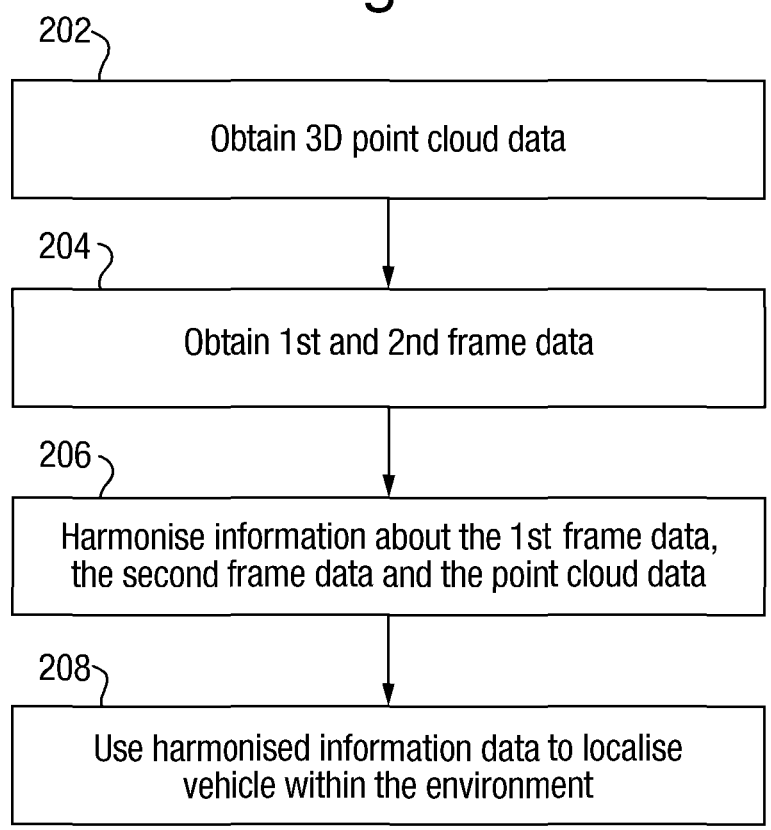
FIG. 2 is a flowchart showing steps performed by an example embodiment.

FIG. 2 illustrates schematically an example of the method performed by the application 112 executing on the computing device 104 in order to localise the vehicle 100 within the environment 120. The skilled person will appreciate that the steps are exemplary only and that in alternative embodiments, some of them may be omitted and/or re-ordered. Further, the method can be implemented using any suitable programming language and data structures.

At step 202, the application 112 obtains 3D point cloud data 114. It will be appreciated that the format and presentation of the data used by the application can vary.

At step 204, image data produced by the sensor 102 is obtained by the application 112. In the illustrated embodiment the image data comprises first frame data representing an image produced by the sensor 102 at a first time and location within the environment, and second frame data representing an image produced by the sensor at a second time and location within the environment. In general, the frames will be sequential/consecutive (although they may not necessarily be immediately consecutive frames, e.g. there may be a small interval/intervening frames between the frames used for processing). In alternative embodiments, a different number of frames may be processed and, as discussed below, images taken from more than one camera onboard the vehicle can also be used.

At step 206, the application 112 executes processes intended to harmonise information about the first frame data, the second frame data and an overlapping subset of the point cloud data in order to determine a location within the point cloud data where at least one of the first frame and the second frame was produced. This step can involve the computations described below and will generally involve finding a minimum of a cost function that maximises similarity of information about appearance of parts of the environment in the first frame data, the second frame data and the overlapping subset of the point cloud data. As detailed below, the cost function can be based on Normalised Information Distance (NID).

At step 208, the application 112 uses data produced at step 206 to localise the vehicle 100 within the environment 120. For instance, if the harmonisation processing indicates that the first (or the second) frame represents a particular location within the environment then the application can indicate that the vehicle was present at that location when the frame was produced by the sensor 102. Further processing steps may be performed to improve accuracy, e.g. compare current time and vehicle velocity with the time stamp of the frame. In some embodiments, vehicle odometry information (e.g. the speed of each wheel available from an anti-lock braking system and steering angle that may be broadcast over a vehicle's bus/network) and a model of how the vehicle behaves (i.e. how the vehicle moves if the sped and steering angle are known) allow the location of the vehicle to be estimated over a time step. In some cases this information can be used as a starting point or "sanity check" with respect to the localisation information provided by the method. The harmonisation of appearance allows the method to localise the vehicle (relative to the prior) because in order to reproject the 3D points into the camera/sensor, the method needs an estimate of the camera position in 3D. In one embodiment an optimisation process is used to change the estimate of the camera position, evaluating the NID derivatives until a minima is reached, which should give an estimate that corresponds to the correct camera position. After it has been computed, the localisation data can be used for various purposes, e.g. assisting with navigating a vehicle, tracking progress of an autonomous vehicle, etc.

A detailed description of the techniques and mathematical basis for the steps performed during the localisation method will now be given with reference to FIG. 3 onwards. The skilled person will appreciate that it is possible to implement the method based on the equations and calculations given below or any mathematical equivalents.

Figure 3:
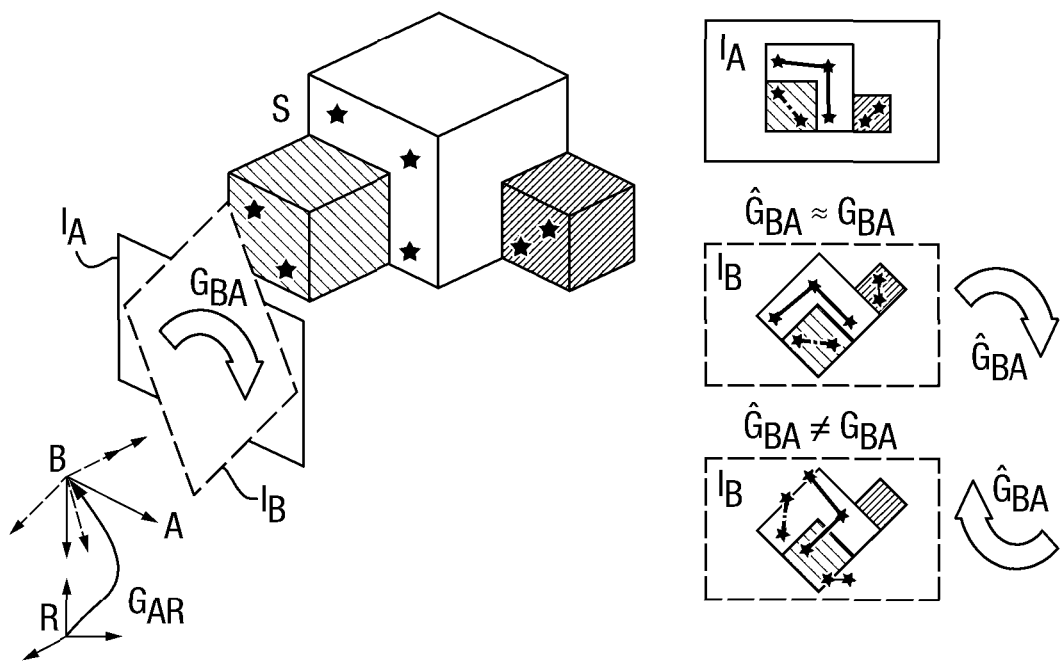
FIG. 3 is an illustration of an example reprojection.

FIG. 3 illustrates schematically a two-view reprojection example. The camera centres (i.e. the centre of the projection for the sensor 102 at particular locations A, B as the vehicle 100 is traversing the environment) are denoted by the coordinate frames {A, B}, the images taken by the sensor at locations A, B as $\{I_A, I_B\}$. $G_{BA} \in SE(3)$ is the homogenous transform that takes points in frame A and maps them to points in frame B: $q_B \equiv G_{BA} \cdot q_A$. Assuming $\hat{G}_{AR}$ (it should be noted that the symbols $\hat{G}_{AR}$ denote "an estimate of $G_{AR}$") and the like is maneuvering known, when the estimated $\hat{G}_{BA}$ is accurate ($\hat{G}_{BA} \approx G_{BA}$) the reprojection into $I_B$ of the points in S align with the captured image and thus their appearance is consistent in both images. When the estimate is wrong ($\hat{G}_{BA} \neq G_{BA}$), the resulting reprojected points do not align with $I_B$ and their appearance is inconsistent.

Figure 4:
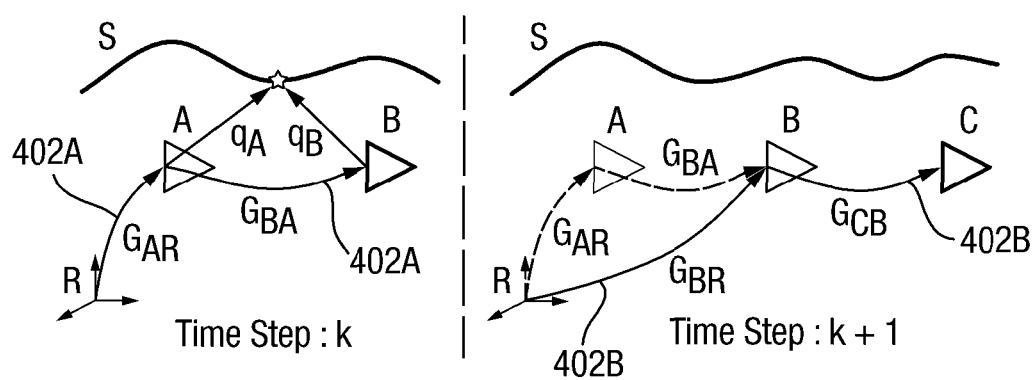
FIG. 4 illustrates schematically a vehicle moving through locations in an environment.

In terms of formulating the problem, the vehicle 100 with the camera 102 moves through an arbitrary, known 3D scene S taking images at different positions, as shown in FIG. 4. The same scene S is defined in reference coordinate system R at positions {A, B, C, . . . } at which it captures images $\{I_A, I_B, I_C, \ldots\}$. For each new image acquired, the transforms to be estimated are shown by lines 402A, 402B and the current pose by the shaded triangles. Considering the left-hand side of the Figure, the method seeks to estimate the current position of the vehicle: B, with respect to the reference coordinate system for the local scene R, through the composition of the previous position A, in R: $G_{AR}$ and the motion between the previous and current frames: $G_{BA}$.

The hypothesis for the inventors' approach is that the true values of $G_{AR}$ and $G_{BA}$ are those which harmonise the information about the appearance of S provided by $I_A$ & $I_B$ and the point cloud appearance prior, which describe the appearance of overlapping subsets of S in some local neighbourhood. Informally, the method seeks the $G_{AR}$ & $G_{BA}$ which minimise the difference in appearance of known points in the world viewed from different, local view-points.

In the context of a ground vehicle 100 operating in busy, mixed environments the geometric structure of the scene is typically complex, thus S is considered to represent a point cloud 114 sampled from the scene, as generated using a 3D LIDAR, as discussed above.

The appearance of a point q in S as viewed from A is the value of the image (colour in the detailed embodiment) at the coordinates in the image plane to which q reprojects and is a function of the intrinsic camera calibration and the position of the camera. In alternative embodiments, image information/attributes other than colour could be used and the skilled person will appreciate that it will be possible to modify the colour-based techniques detailed herein to work with other types of image information. For example, LIDAR intensity, infra-red/hyper-spectral intensity, etc., values could be used. In some cases, this appearance information may be generated when the original environment survey is performed, but in other cases a 3D point cloud data built using the survey data can be processed further so that it includes appearance information that is used by the localisation method. For instance, colour values in an original 3D point cloud could be processed to represent different, hyper-spectral values (e.g. LIDAR intensities) for an embodiment of the localisation method that uses that type of values as the appearance information that is harmonised using an NID-based cost function (e.g. an embodiment running on a vehicle equipped with one or more LIDAR sensors).

Using the pinhole camera model from R. I. Hartley and A. Zisserman, Multiple View Geometry in Computer Vision. Cambridge University Press, ISBN: 0521623049, 2000 and denoting the camera parameters by k, it is possible to define the reprojection operator P, which maps a point $q \in R^3$ defined in the same reference coordinate system R, as the camera to its image $x \in R^2$ in the image-plane of the camera. The value of the image (colour in the detailed embodiment) at x is denoted by $I(x) \in R^k$ for an image with k channels (k=3 for RGB).

$$x_A = P(q, G_{AR}, k) \quad (1)$$

Figure 5:
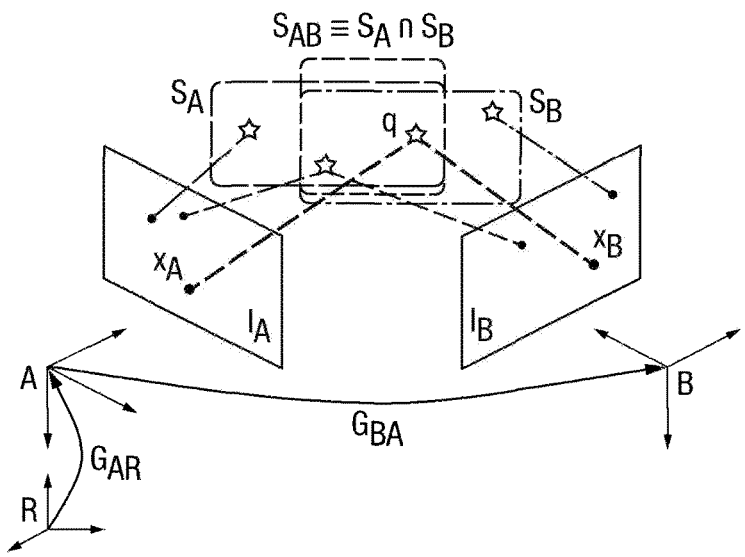
FIG. 5 illustrates schematically an example two-view projection.

It is then possible to write the problem shown graphically in FIGS. 3 and 5, as that of computing estimates $\hat{G}_{AR}$ & $\hat{G}_{BA}$ of $G_{AR}$ and $G_{BA}$ respectively, by minimising an objective function f: $R^{2 \times (|S_{AB}| \times k)} \to R^1$ given in equation (2) below (for two k-channel images), which measures the discrepancy between the visual appearance of the subset of points $S_{AB} \subseteq S$ that reproject into both $I_A$ and $I_B$.

$$f\left(\overbrace{I_A(P(q, \hat{G}_{AR}, k))}^{\text{Appearance of } S_A \text{ from } A}, \overbrace{I_B(P(q, \hat{G}_{BA}\hat{G}_{AR}, k))}^{\text{Appearance of } S_B \text{ from } B}\right) | q \in S_{AB} \equiv S_A \cap S_B) \quad (2)$$

$$: R^{2 \times (|S_{AB}| \times k)} \to R^1 \equiv f(I_A(x_A), I_B(x_B) \ q \in S \equiv S \cap S)$$

In the two-view reprojection of FIG. 5, the camera centres are denoted by the coordinate frames {A, B}, the images by $\{I_A, I_B\}$, the subset of the scene S visible in each image independently by $\{S_A, S_B\}$ and the subset of the scene visible in both images by $S_{AB}$, which is the only component to contribute to the objective function given by equation (2).

Two important distinctions between the above formulation and known feature-based localisation techniques are the issues of feature selection and correspondence. In known feature-based formulations (such as G. Sibley, C. Mei, I. Reid, and P. Newman, "Vast-scale Outdoor Navigation Using Adaptive Relative Bundle Adjustment," The International Journal of Robotics Research, vol. 29, no. 8, p. 958, 2010), the features and their correspondences have to be explicitly identified in each new frame with significant care taken to ensure correct data association. In the formulation used herein, the point correspondences between frames are implicitly known through $S_{AB}$. The issue of point selection is that of selecting the visible subset of points for a given camera position, a typically inexpensive operation that can be aided significantly by offline preprocessing of the point cloud, which can also be used to improve the suitability of the points in S for localisation.

From the proposed minimisation given in equation (3), $I_A(x_A)$ & $I_B(x_B)$ are dependent upon both $\hat{G}_{AR}$ and $\hat{G}_{BA}$. Therefore, so is $S_{AB} \equiv S_{AB}|_{\hat{G}_{AR}, \hat{G}_{BA}}$, for brevity the $|_{\hat{G}_{AR}, \hat{G}_{BA}}$ nomenclature is dropped from $S_{AB}$, however, to be clear, $S_{AB}$ is dependent upon the current candidates for $\hat{G}_{AR}$ & $\hat{G}_{BA}$.

$$\{\hat{G}_{AR}, \hat{G}_{BA}\}: \min_{\{\hat{G}_{AR}, \hat{G}_{BA}\}} f(I_A(x_A), I_B(x_B) \,|\, q \in S_{AB}) \quad (3)$$

As in G. Silveira, E. Malis, and P. Rives, "An efficient direct approach to visual SLAM," Robotics, IEEE Transactions on, vol. 24, no. 5, pp. 969-979, 2008, for instance, in the optimisation transforms are estimated to be applied to initial estimates of the transforms, thus allowing for the incorporation of a motion model, or similar seed to the algorithm.

Numerous potential choices exist for the objective function given in equation (2). The inventors desired a function that is robust to noise, with a wide basin of convergence to a clear, ideally unique, minimum and is thus well suited to solution by numerical optimisation. In the context of image registration for related problems, G. Silveira, E. Malis, and P. Rives, "An efficient direct approach to visual SLAM," Robotics, IEEE Transactions on, vol. 24, no. 5, pp. 969-979, 2008; A. Comport, E. Malis, and P. Rives, "Real-time Quadrifocal Visual Odometry," The International Journal of Robotics Research, vol. 29, no. 2-3, p. 245, 2010 and G. Silveira and E. Malis, "Unified Direct Visual Tracking of Rigid and Deformable Surfaces Under Generic Illumination Changes in Grayscale and Color Images," International Journal of Computer Vision, vol. 89, pp. 84-105, August 2010, use SSD (sum of squared differences), in some cases with efficient second order minimisation and in another case with a robust Huber kernel. In other known work, T. Pock, M. Urschler, C. Zach, R. Beichel, and H. Bischof, "A duality based algorithm for TV-L1-optical-flow image registration," in Medical Image Computing and Computer-Assisted Intervention MICCAI 2007, vol. 4792 of Lecture Notes in Computer Science, pp 511-418, Springer Berlin/Heidelberg 2007, uses the $L^1$-norm and others, such as, A. Dame and E. Marchand, "Mutual Information-Based Visual Servoing," Robotics, IEEE Transactions on, vol. 27, no. 5, pp. 958-969, 2011, maximise the Mutual Information.

In contrast, the present inventors chose instead to use the Normalised Information Distance (NID) (see M. Li, X. Chen, X. Li, B. Ma, and P. Vitanyi, "The similarity metric," Information Theory, IEEE Transactions on, vol. 50, pp.

3250-3264, December 2004 and A. Kraskov, H. St"ogbauer, R. G. Andrzejak, and P. Grassberger, "Hierarchical Clustering Based on Mutual Information," eprint arXiv:qbio/0311039, November 2003) because its basis as a Shannon information measure allows a clear understanding and it has similar robustness properties to the Mutual Information by virtue of its dependence only upon distributions and not samples. Crucially, unlike the Mutual Information, it is also a true metric.

The normalised information distance NID(X, Y) for two (discrete) random variables {X, Y} is a Shannon information measure that represents the similarity between the distributions of X and Y. Formally, NID(X, Y) is given by equation (7) below, where H(X), H(X, Y) and I(X; Y) denote the entropy, joint entropy and mutual information respectively given by equations (4) to (6).

$$H(X) \equiv -\sum_{x \in X} p_x \log(p_x) \tag{4}$$

$$H(X, Y) \equiv -\sum_{x \in X, y \in Y} p_{xy} \log(p_{xy}) \tag{5}$$

$$I(X; Y) \equiv H(X) + H(Y) - H(X, Y) \tag{6}$$

The NID is a true metric and is thus nonnegative, symmetric and satisfies the triangle inequality: NID(X, Y)+NID(Y, Z)>=NID(X, Z) and NID(X, Y)=0⇔X=Y. It is also bounded in both directions: 0<=NID(X, Y)<=1, with smaller values indicating greater similarity.

$$NID(X, Y) \equiv \frac{H(X \mid Y) + H(Y \mid X)}{H(X, Y)} \tag{7}$$

$$NID(X, Y) \equiv \frac{H(X, Y) - I(X, Y)}{H(X, Y)} \tag{8}$$

In terms of application of the NID, consider the problem formulation given above by modelling the appearance of the points in the scene from each view point I(x) as samples from (discrete) random variables, it is possible to substitute NID(X, Y) as the objective function in equation (3) to obtain equation (9) below, the minimum of which maximises the similarity of the information about the appearance of the scene $S_{AB}$ provided by $I_A$ & $I_B$.

$$\{\hat{G}_{AR}, \hat{G}_{BA}\}: \min_{\{\hat{G}_{AR}, \hat{G}_{BA}\}} NID(I_A(x_A), I_B(x_B) \mid q \in S_{AB}) \tag{9}$$

1) Incorporation of Prior Appearance Information: A key benefit arising from NID(X, Y) being a true metric, is that if an appearance prior is available for the scene (which is assumed will typically be the case) then the method can meaningfully incorporate it. This can be achieved by modifying the objective function to equation (10), where $I_S(x_S)$ is the prior appearance of a point.

$$f \equiv NID(I_A, (x_A), I_B, (x_B) \mid q \in S_{AB}) + \tag{10}$$
$$NID(I_A, (x_A), I_S, (x_S) \mid q \in S_{AB}) +$$
$$NID(I_B, (x_B), I_S, (x_S) \mid q \in S_{AB})$$

Whilst the use of $I_S(x_S)$ might be assumed to be problematic in the event that the camera and/or conditions under which it was captured differ from the current ones, the inventors have found that the NID exhibits similar desirable robustness to illumination changes and occlusion to that obtained by mutual information-based image registration techniques, such as J. P. W. Pluim, J. B. A. Maintz, and M. A. Viergever, "Mutual information-based registration of medical images: a survey," Medical Imaging, IEEE Transactions on, vol. 22, no. 8, pp. 986-1004, 2003. Specifically, they found that whilst the use of $I_S(x_S)$ has little impact on the structure of the cost function for $\hat{G}_{BA}$, it significantly improves the structure for $\hat{G}_{AR}$, particularly when the inter-image spacing is small and the environment exhibits perceptual aliasing.

2) Computation of the Joint Appearance Distribution: There are various methods that could be used to approximate the joint appearance distribution (which may be the discrete joint appearance distribution in some embodiments): $p_{AB}(a, b) \equiv Pr(I_A(x_A)=a \cap I_B(x_B)=b)$. As the inventors wished to utilise gradient-based optimisation methods, they required a form for $p_{AB}$ with analytical derivatives that are fast to compute. The inventors chose to use cubic B-Spline (see L. Piegl and W. Tiller, The NURBS book. Springer Verlag, 1997) interpolation to update multiple bins in the joint-histogram for each x, with fractional weights corresponding to the product of the B-Spline coefficients; represented graphically in FIG. 6.

$$p_{AB}(a, b) = \tag{11}$$

$$\frac{1}{|S_{AB}|} \sum_{q \in S_{AB}} \sum_{m \in M} \sum_{n \in N} \beta_m(x_A) \beta_n(x_B) \delta\left(a - \left\lfloor \frac{I^\beta_{A,m}}{\tau_A} \right\rfloor\right) \delta\left(b - \left\lfloor \frac{I^\beta_{B,m}}{\tau_A} \right\rfloor\right)$$

In the B-Spline interpolation $p_{AB}$ histogram updates of FIG. 6 (equation (11)), it should be noted that the schematic shown is for 1-degree, not cubic, splines for ease of illustration. $I^\beta_{A,M}$ denotes the 2×2 pixel region of local-support (in which the B-spline coefficients $\beta_m(x_A)$ are non-zero), for $x_A$ in the B-spline interpolated image (derived from $I_A$). Respectively, $I^\beta_{B,N}$ denotes the same concept but for $I_B$ & $x_B$. For the reprojections of a single 3D point q into both images: {$x_A$, $x_B$}, the bins updated in the histogram approximation of the joint distribution $p_{AB}$ are not (necessarily) adjacent; rather, the bins updated are those which contain the values of the pixels in the region of local support for {$x_A$, $x_B$} in the interpolated images. The contributions to each bin are given by the product of the B-spline coefficients: $\beta_m(x_A) \beta_n(x_B)$ as shown in equation (11) above.

Formally, the histogram approximation of $p_{AB}$ can be written as a summation over all points given in equation (11). Where $\beta_m(x_A)$ denotes the B-spline coefficient for the m-th pixel in the region of local-support for $x_A$ (in which the B-spline coefficients are non-zero) in the interpolated image $I^\beta_A$. By definition, the cardinality of the region of local-support (M) is defined by the order of the B-spline, for the cubic B-splines used here |M|=16. Respectively, the other terms denote the same concepts, but for the image captured at B.

$$\sum_{m \in M} \beta_m(u) = 1, \quad (12)$$

$$\{\beta_m(u) = 0 \ \forall \ m \notin M\}$$

In the context of the standard form for a B-spline surface consisting of a double summation over the control points in each parametric direction, $\beta_m(x_A)$ represents the product of the two univariate B-spline basis functions and hence satisfies the partition of unity property equation (12), thus equation (11) requires no additional normalisation.

The delta-functions in equation (11) determine which bin is updated in the joint histogram, $I^\beta_{A,m}$ denotes the value of the m-th pixel in the region of local-support for $x_A$ in the interpolated image and $T_A$ denotes the bin-size. In the results presented here, the inventors have used evenly spaced bins across the range of values for each channel (0-255), with the number of bins $\eta_A = \eta_B = \eta = 30$; however, they found that the formulation presented here is typically very robust to changes in $\eta$.

3) Computation of Analytical Derivatives: For the NID, the method can compute analytical derivatives for equation (9). Differentiating the objective function with respect to a transform G yields equation (13), where the nomenclature has been abbreviated. The corresponding derivatives for the joint information HAB and mutual information $I_{AB}$ are given in equations (14) and (15). The inventors specialised equation (15) to be with respect to $G_{BA}$ as its form is not equivalent (excepting the $\delta p_{AB}$ term) under $\delta G_{AR}$, as in that case $I_{AB}$ depends on $p_A$, which is not constant.

$$\frac{\partial NID_{AB}}{\partial G} = \frac{H_{AB}\left(\frac{\partial H_{AB}}{\partial G} - \frac{\partial I_{AB}}{\partial G}\right) - \frac{\partial H_{AB}}{\partial G}(H_{AB} - I_{AB})}{H_{AB}^2} \quad (13)$$

$$\frac{\partial H_{AB}}{\partial G} = -\sum_{a,b} \frac{\partial p_{AB}}{\partial G}(1 + \log(p_{AB})) \quad (14)$$

$$\frac{\partial I_{AB}}{\partial G_{BA}} = \sum_{a,b} \frac{\partial p_{AB}}{\partial G_{BA}}\left(1 + \log\left(\frac{p_{AB}}{p_B}\right)\right) \quad (15)$$

Considering equation (11) and noting that $\beta(x)$ depends only on x, not on $I^\beta$ and that $x_A$ is not dependent upon $G_{BA}$, $$\frac{\partial p_{AB}}{\partial G_{BA}}$$

is another histogram summation involving eq. (16) (and $\beta_m(x_A)$).

$$\frac{\partial \beta_n(P(q_R, G_{BA}G_{AR}))}{\partial G_{BA}} = \frac{\partial \beta_n}{\partial x_B}\frac{\partial x_B}{\partial q_B}\frac{\partial q_B}{\partial G_{BA}} \quad (16)$$

Where $$\frac{\partial \beta_n}{\partial x_B}$$

is obtained from standard B-spline basis function derivative equations and $$\frac{\partial x_B}{\partial q_B}$$

is dependent upon the camera model, which in some embodiments use the formulation presented in G. Klein, Visual Tracking for Augmented Reality. PhD thesis, University of Cambridge, 2006.

The derivatives of equation (10) with respect to $G_{BA}$ and equations (9) and (10) with respect to $G_{AR}$ can also be similarly computed, via modest changes to $\delta I_{AB}$ and $\delta_q/\delta G$.

The extension of the present method to a vehicle with multiple cameras is possible by exploiting the metric property of NID. Assuming the images are temporally aligned, the NID can be computed between consecutive frames for each camera independently, then summed over all cameras to produce the total cost.

For the alignment of images using the mutual information, blurring the images prior to alignment typically results in a broadening of the convergence basin. Empirically, the inventors have found that this also applies to the NID.

Results of experiments performed using a vehicle configured to execute an embodiment of the localisation method will now be given. To evaluate the performance of the proposed system, a 3D LIDAR point cloud S, consisting of 2.6 million points was constructed for the loop with a circumference of approximately 690 m shown in FIG. 7 using a SICK LMS-151 LIDAR mounted on the roof of a vehicle 100, approximately 2 m off the ground and declined by 8.5°. The vehicle was also equipped with a Point Grey Bumblebee2 monochrome stereo camera, from which only the images from the left camera were used; and an OxTS 3042 6-DoF INS used for ground-truth. The images from the left camera of the stereo pair for this loop (after rectification) form the test image set, consisting of 271 512×384 images sampled at 2 Hz at a speed of 10 mph resulting in a mean image separation of 2.5 m. The camera data from a second loop was used to build the appearance prior for S, taken to be the average (colour) intensity for each point across all images captured within 60 m in which the point was visible.

The inventors adopted the NASA coordinate system (G. Sibley, C. Mei, I. Reid, and P. Newman, "Vast-scale Outdoor Navigation Using Adaptive Relative Bundle Adjustment," The International Journal of Robotics Research, vol. 29, no. 8, p. 958, 2010) in the experiments, with X-forward, Y-right and Z-down in the vehicle/robot's coordinate frame. An offset UTM coordinate system with X-Northing, Y-Easting, Z-Down is used as the reference coordinate frame R, in which S is defined and the robot's pose is to be estimated.

FIG. 8 show iso-surface plots of the cost function components of equation (10) for $G_{BA}$ & $G_{AR}$ separately, for $\Delta$s about their ground-truth values given in the table below for the two sequential images shown in FIGS. 8a and 8c. With the transform for which the cost is not shown in each Figure held at its ground-truth value in each case.

| Transform | X (m) | Y (m) | Z (m) | Roll (deg.) | Pitch (deg.) | Yaw (deg.) |
|---|---|---|---|---|---|---|
| $G_{AR}$ | 49.3473 | 94.8116 | −0.6958 | −2.2266 | −3.0308 | −168.7081 |
| $G_{BA}$ | −2.2108 | 0.0559 | 0.1071 | −0.0647 | 0.0990 | 0.0308 |

Figure 8A:
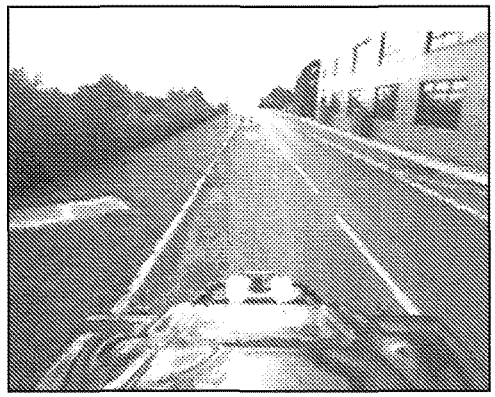
Figure 8B:
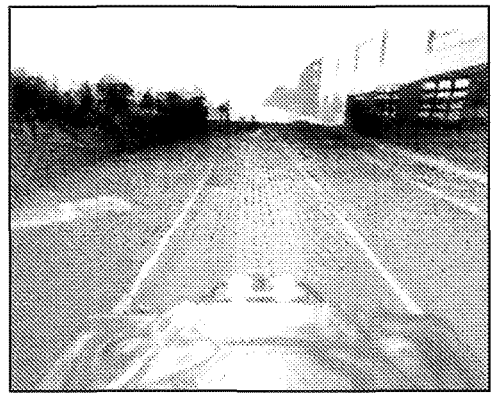
Figure 8C:
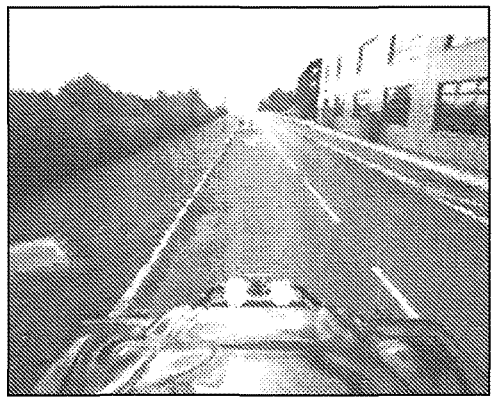
Figure 8D:

Approximately 30,000 prior LIDAR points are common to both sample images ($S_{AB}$): FIGS. 8b and 8d, and were used in the computation of the costs. The subplots on the right of each Figure show the evolution of the cost (lines with troughs) and its analytical derivative (lines with peaks) along the corresponding (black) sample lines aligned with each Δ-axis in the iso-surface plot. The iso-surfaces have been inverse alpha-blended (higher costs are more transparent/lighter) for ease of illustration.

Figure 7:
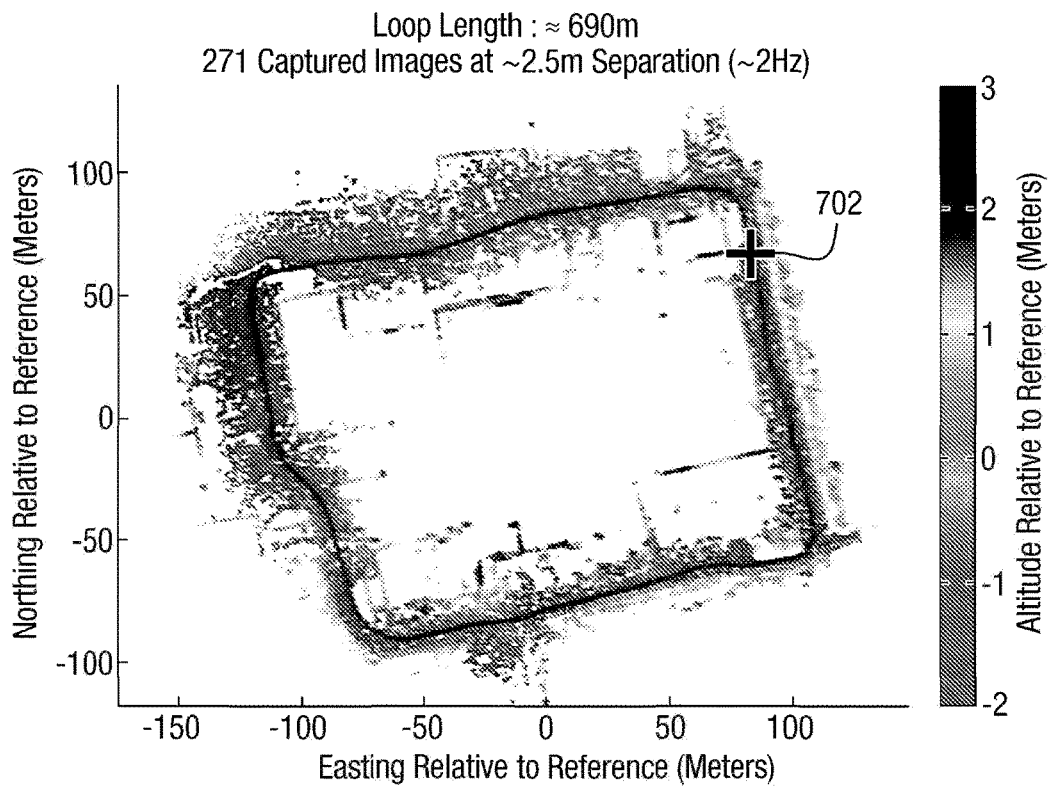
FIG. 7 is a graphical overhead view of a scene used for experimental results.

The location of the first image in S is highlighted in FIG. 7, which is an overhead view of S used for experimental results, with the loop trajectory shown in the dark/black line and the location of the images used for FIG. 8 denoted by a cross 702.

Figure 8E:
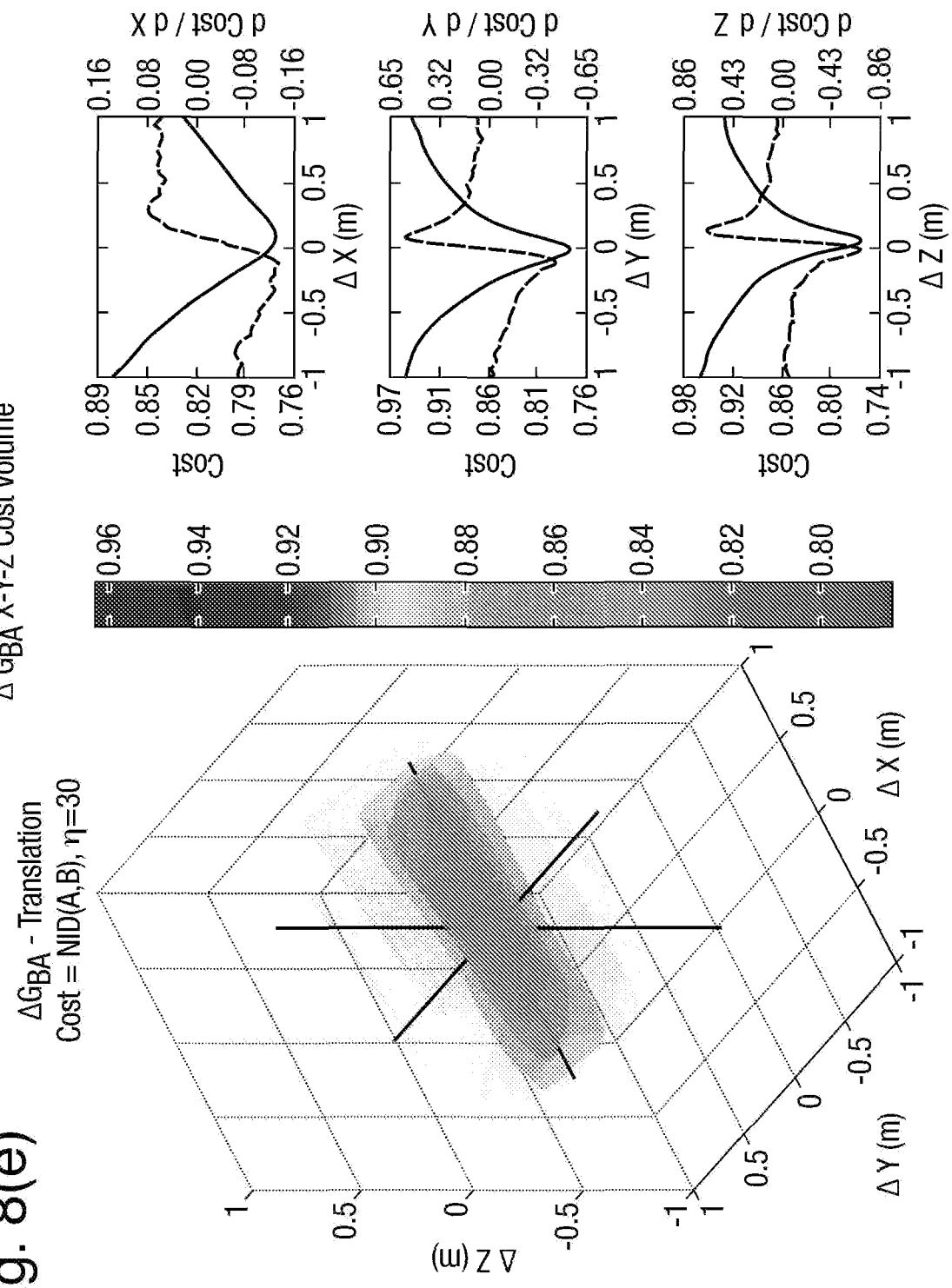
Figure 8F:
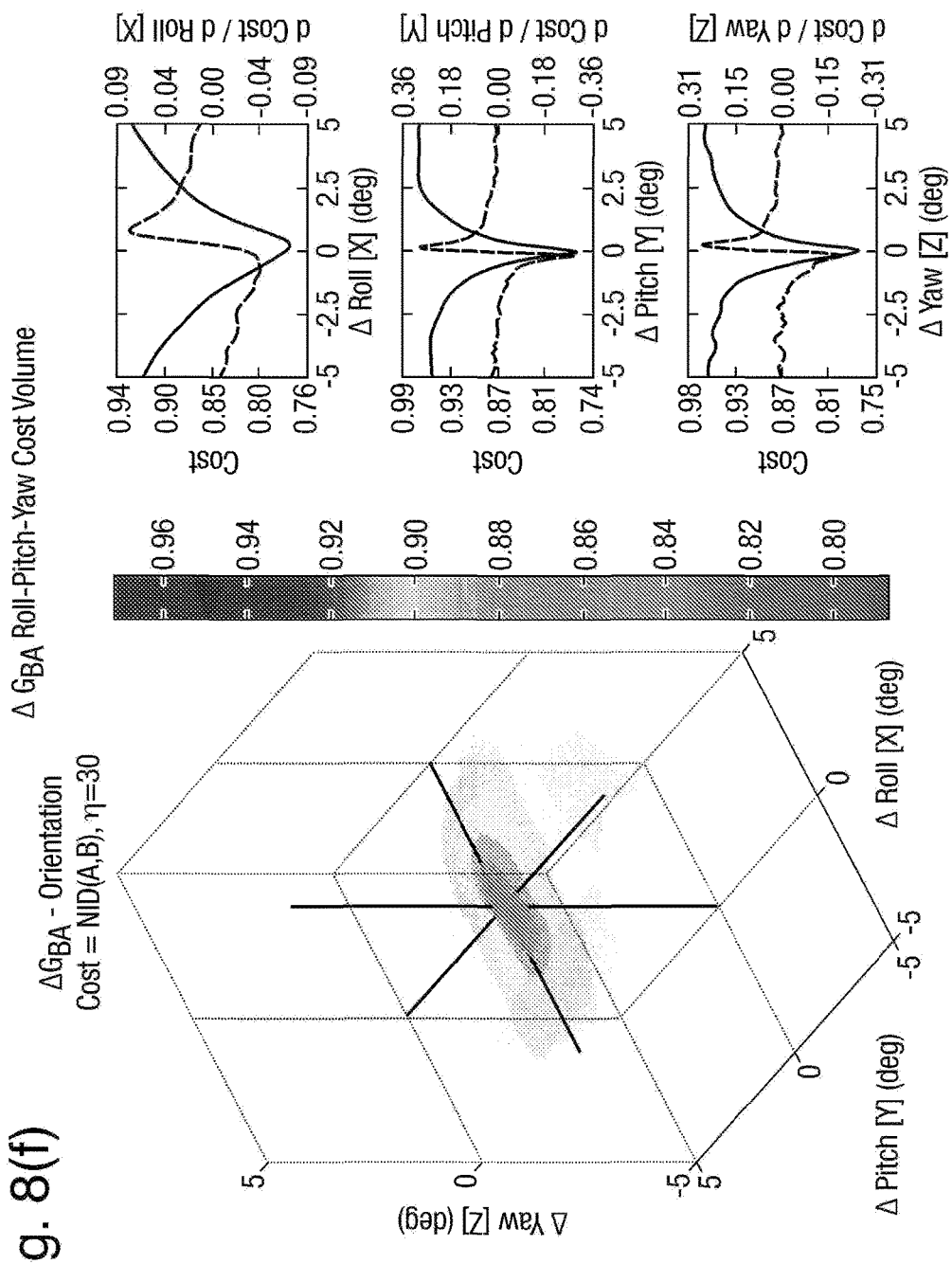

Considering the iso-surfaces for $\Delta G_{BA}$ in FIGS. 8e and 8f, the cost function is the local inter-frame cost component of eq. (10): $NID(I_A, I_B)$ and appears very well behaved and well suited to optimisation: smooth, with clear minima at the ground-truth values (Δ=0), shown by the sample lines evaluated along each Δ axis. Additionally, the analytical gradients evaluated along the sample lines are also well behaved and accurately represent the gradient of the cost.

The elongation of the iso-surfaces in FIG. 8e along the Δ X axis corresponding with the wide, shallow peak in the sample line along its axis, is a result of the camera and scene geometry. From FIGS. 8b and 8d it is clear that neither the camera view, nor the position of the reprojected points shifts significantly between the images, despite $G_{BA}$ consisting of a translation of 2.2 m in the X direction, thus a shallow peak in this axis is intuitive. The sharper peaks in FIG. 8f are similarly intuitive given the greater effect on the reprojected positions of points in the far-field of angular changes given the position of the camera on the vehicle.

Figure 8G:
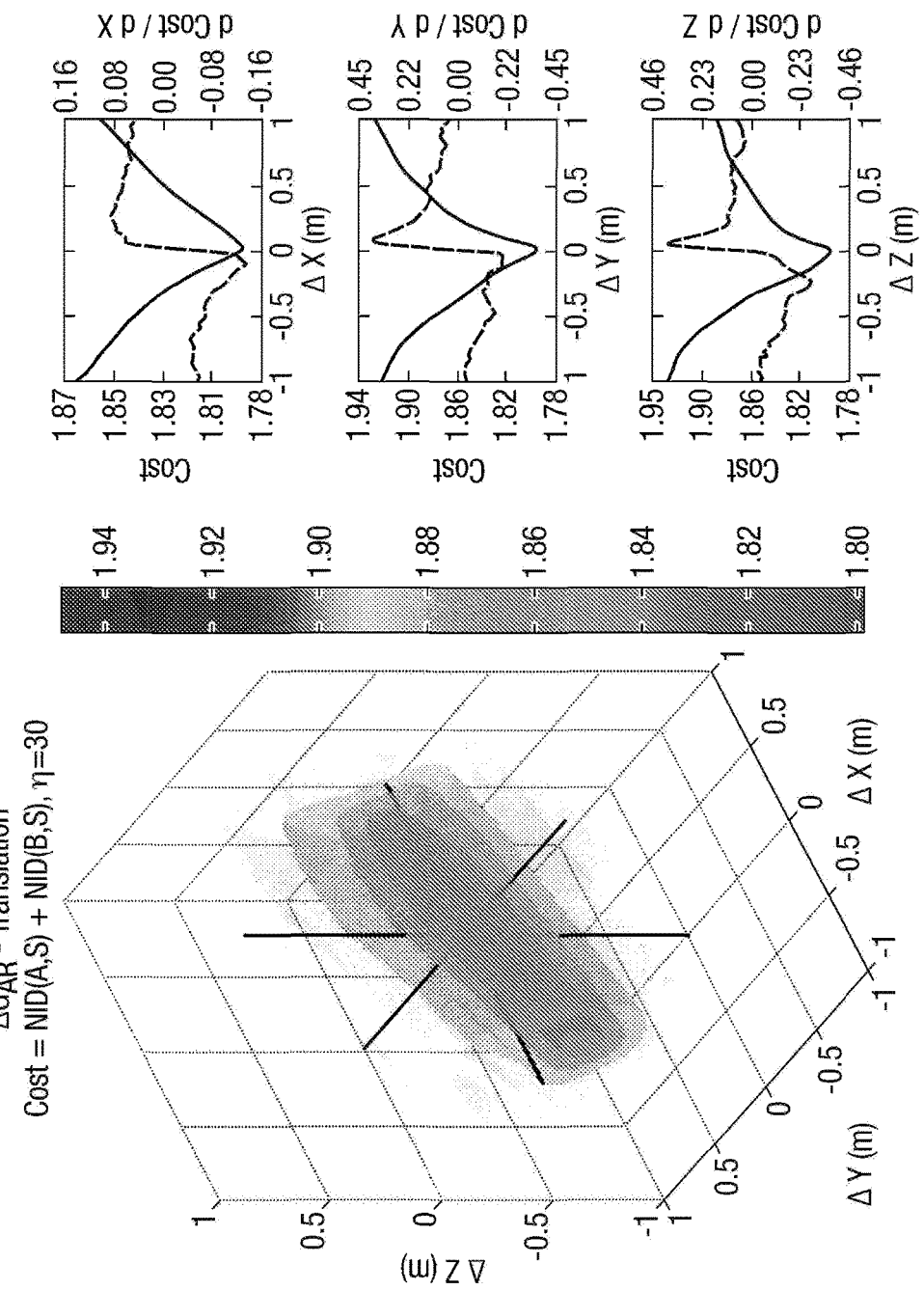

The results for Δ $G_{AR}$ are shown in FIGS. 8g and 8h, where the cost shown is the local-to-prior component of equation (10): $NID(I_A, I_S)+NID(I_B, I_S)$, with $G_{BA}$ held at its ground truth value. This function and its analytical derivatives also appear relatively well behaved, with clear minimum in the cost at the ground-truth values (Δ=0). The weak constraint angled at approximately 10 degrees off the X-axis in the XY plane in FIG. 8g is the mapping of the weak constraint in X in FIG. 8e from the local robot coordinate system (X forward) into the reference coordinate system of $G_{AR}$ (X-North). As at the points the images were captured, the vehicle was travelling within 10 degrees of due south in the reference frame, as shown in FIG. 7.

These results are indicative of the robustness of NID to changing conditions, as the simple (averaged) appearance prior is not very accurate or even very consistent, due to illumination and auto-exposure changes between the widely spaced images.

In order to investigate the convergence of $\hat{G}_{BA}$, independently for each pair of consecutive images in the test set $G_{AR}$ was held at its ground-truth value and $\hat{G}_{BA}$ was initialised to its ground-truth value with samples drawn from independent uniform additive noise with extents ±0.5 m and ±2.5° added to the translation and orientation components respectively. From this noisy initial position a quasi-Newton optimiser using the analytical derivatives detailed above was used to find the minima, stopping when Δ Cost<=$10^{-6}$. Two sequential optimisation cycles were performed for each image pair, the first using blurred images (Gaussian filter, 15 pixels square with σ=5). The second cycle, which took as its input the output of the first, used the raw (unmodified) images. This was done to improve the basin of convergence as noted above by approximating an image pyramid technique. As the aim was to investigate $G_{BA}$, the scene prior was not used.

Figure 9A:
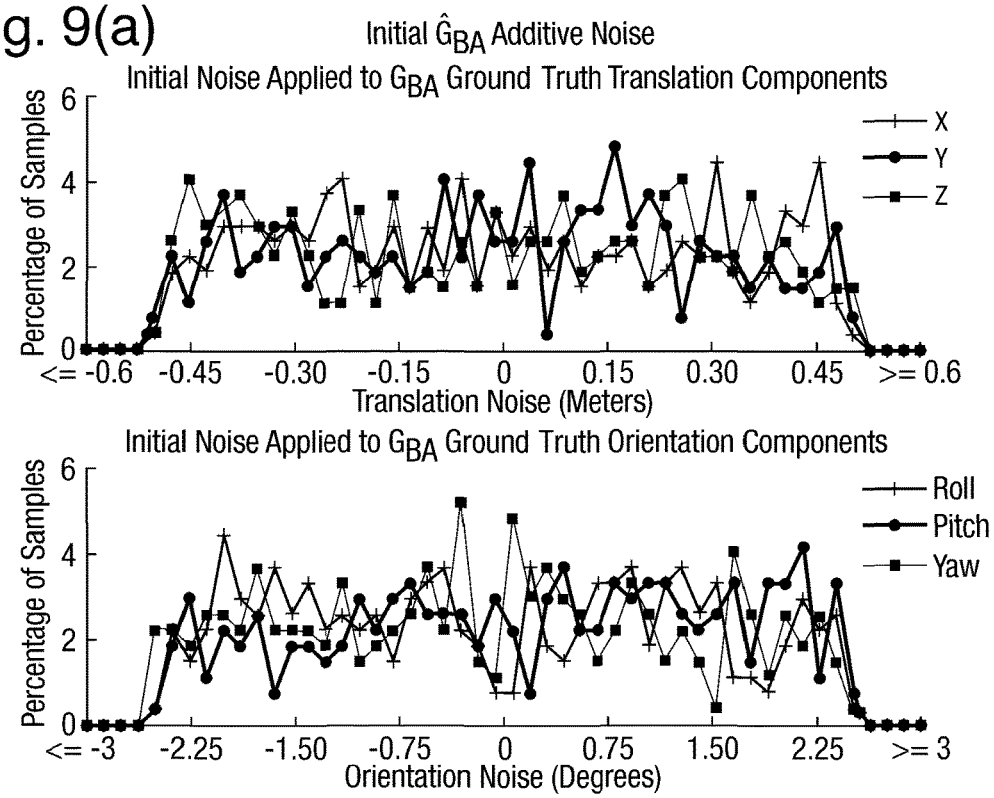
Figure 9B:
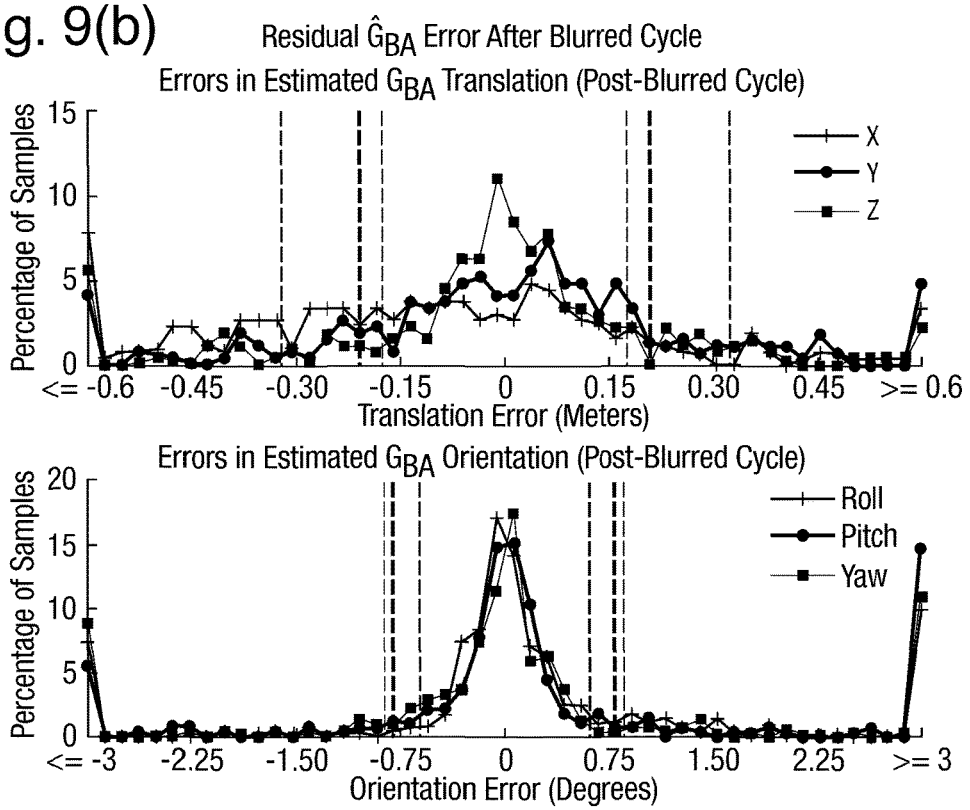

FIGS. 9a to 9c show the distributions over all sequential test image pairs, of the initial additive noise and residual errors in $\hat{G}_{BA}$ at the end of each cycle of the optimisation, respectively. Results of independent optimisations (η=30) for $G_{BA}$ (with $G_{AR}$ held at its ground-truth value) over all sequential pairs of images in the test-set. Showing the distributions of additive noise added to ground-truth to form initialization values of $\hat{G}_{BA}$: FIG. 9a and the residual errors in $\hat{G}_{BA}$ after termination: 9b and 9c. The vertical dashed lines in FIGS. 9b and 9c denote the 1-σ bounds. The speed of convergence is shown in FIGS. 9d to 9g, which show for the blurred and raw (unmodified) image cycles, a histogram over all image pair samples of the 'cost-to-come' at each iteration and the percentage of optimisations still running after k-iterations respectively. Finally, FIG. 9h shows a sample image after blurring (Gaussian filter, 15 pixels square with σ=5) and FIG. 9i shows one of the test-images with point reprojections using the ground-truth $G_{BA}$ (generally shown at 901) and a noisy initialisation [before optimisation] (generally shown at 902) drawn from FIG. 9a. In the case shown, the additive noise on $G_{BA}$ is [−0:225; −0:065; 0:033] meters (X; Y; Z) and [−1:383; −2:248; 2:135] degrees (Roll, Pitch, Yaw). The point reprojections after the optimisation are not shown as they are indistinguishable from those at ground-truth.

The results in FIG. 9c broadly reflect the width of the peaks at the minima in FIGS. 8e and 8f, with greater confinement in the orientation components than in the translation components. Contributors to the width of the error peaks include: residual error in the extrinsic camera calibration used to estimate ground-truth, the low resolution of the camera and some particularly challenging areas where the camera views are non-informative (e.g. looking into a hedge). However, the error distributions, particularly in orientation provide strong evidence of the validity of the formulation and to the typicality of the results presented in FIGS. 8e and 8f.

Figure 9D:
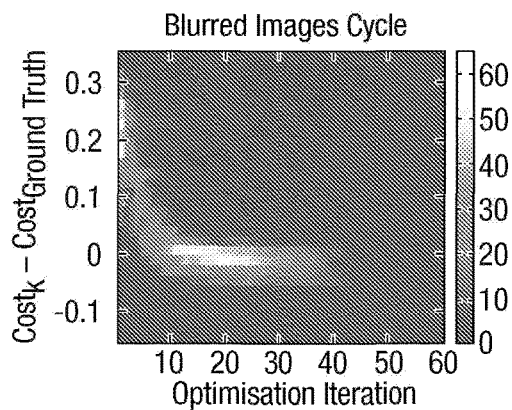
Figure 9E:
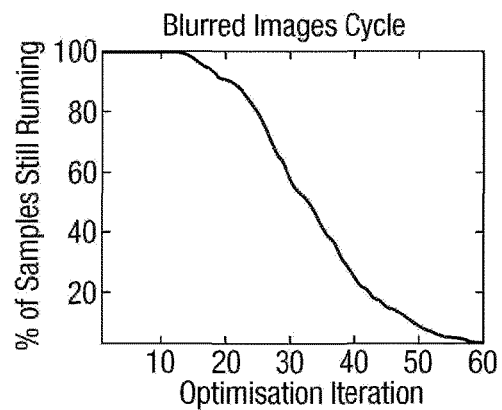
Figure 9F:
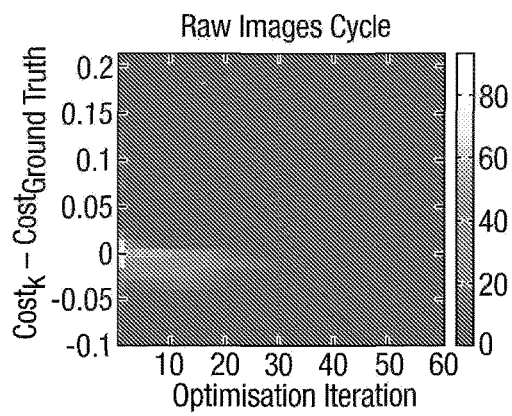
Figure 9G:
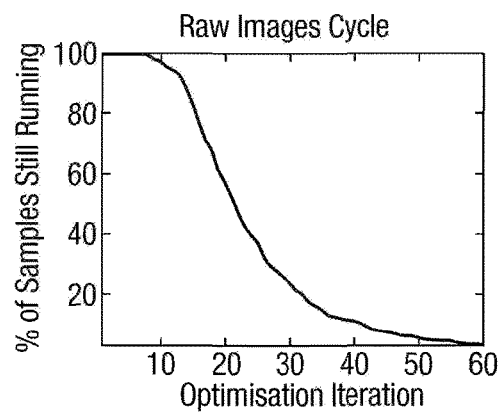
Figure 9H:
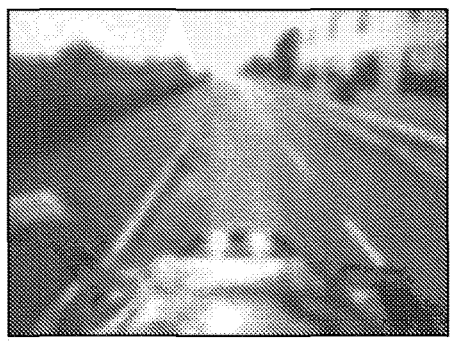
Figure 9I:
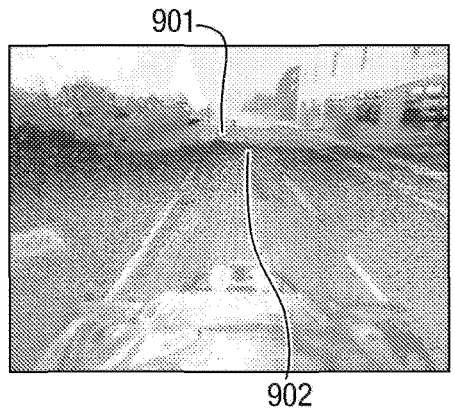

Although the embodiment detailed above is off-line and not capable of real-time performance, to demonstrate the speed of convergence of the optimisation FIGS. 9d and 9e show respectively, a histogram over all image-pair samples of the 'cost-to-come' at each iteration and the percentage of samples for which the optimiser had not terminated after k-iterations. The key point to note from FIG. 9d is that the 'cost-to-come' converges to zero rapidly after≈10 iterations, with the remainder of the time spent performing fine-detail refinement.

Developments based on D. Ruijters and P. Thevenaz, "GPU Prefilter for Accurate Cubic Bspline Interpolation," The Computer Journal, vol. 55, pp. 15-20, December 2011, for GPU accelerated B-spline interpolation, which is a performance bottleneck in the detailed implementation, can be used to achieve real-time, online performance. Further, multiple cameras on the vehicle/robot can be exploited to be localised with different view-points to improve the gradient of the cost function for the translation components of the transforms. As previously discussed, the confinement of the NID cost function in the present formulation is a function of both the scene and the relative geometry of the camera(s), thus suitable preprocessing of the raw point cloud can improve its suitability and evaluate its sufficiency for navigation.

The embodiments described herein provide a new method for localising a robot, vehicle or the like equipped with a monocular camera in a previously gathered 3D LIDAR point cloud survey prior by harmonising both the locally viewed appearance of the workspace between consecutive frames and the local appearance of the workspace relative to an appearance prior. Embodiments of the method use the Normalised Information Distance (NID), a true Shannon information metric, as the cost function to compare distributions over appearance for common subsets of S, the method being suitable for real-time, parallel computation. The inventors have also presented results demonstrating the desirable behaviour of the NID as a cost function for the problem using data gathered from a road vehicle driving in a light-urban environment. The embodiments make extensive use of prior 3D information and so they can reduce sensing requirements and costs whilst maintaining the accuracy and robustness required.

The invention claimed is:

1. A method of localising transportable apparatus within an environment, the method including:
   obtaining point cloud data representing a 3D point cloud including a plurality of points in a reference coordinate system of at least part of the environment;
   obtaining first frame data representing a first image produced by an imaging sensor on board transportable apparatus at a first location within the environment;
   obtaining second frame data representing a second image produced by the imaging sensor at a second location within the environment; and
   determining a first subset of points in the first frame data that overlap with at least some of the plurality of points of the 3D point cloud in the reference coordinate system;
   determining a second subset of points in the second frame data that overlap with at least some of the plurality of points of the 3D point cloud in the reference coordinate system, the first frame data being different than the second frame data;
   determining a location within the 3D point cloud where the overlapping first subset of points in the first frame data and the overlapping second subset of points in the second frame data were produced, thereby localising the transportable apparatus within the environment;
   obtaining a velocity of the transportable apparatus at a specified time;
   comparing the specified time and the velocity to a time that the first frame or the second frame was captured; and
   when the specified time and the velocity match the time that the first frame or the second frame was captured, verifying the location of the transportable apparatus within the 3D point cloud.

2. The method according to claim 1, wherein determining the location within the 3D point cloud includes finding a minimum of a cost function that maximises similarity of information about appearance of parts of the environment in the first frame data, the second frame data and the overlapping first and second subsets of points in the first and second frame data.

3. The method according to claim 2, wherein the cost function comprises a Normalised Information Distance (NID) function.

4. The method according to claim 3, wherein determining the location within the 3D point cloud includes modelling the appearance of points in the first frame data, the second frame data and/or the overlapping first and second subsets of points in the first and second frame data as samples from random variables so that the NID cost function produces a measure of similarity between distributions of the variables.

5. The method according to claim 1, wherein the first frame data and the second frame data, respectively, comprise consecutive images taken over a period of time.

6. The method according to claim 4, including providing a plurality of imaging sensors on board the transportable apparatus and the method includes:
   aligning image data produced by the plurality of imaging sensors;
   computing the NID cost function between consecutive frames for each said imaging sensor independently; and
   summing the NID cost functions over all the imaging sensors to produce a total cost function.

7. The method according to claim 6, including blurring the images prior to the aligning of the image data.

8. The method according to claim 1, wherein the 3D point cloud data is generated by a prior survey of the environment.

9. The method according to claim 1, wherein the imaging sensor comprises a monocular camera.

10. The method according to claim 1, wherein the appearance information comprises colour values for points in the 3D point cloud.

11. A transportable apparatus including:
   a device configured to obtain point cloud data representing a 3D point cloud including a plurality of points in a reference coordinate system of at least part of an environment;
   an imaging sensor configured to obtain first frame data representing a first image at a first location within the environment and second frame data representing a second image produced by the sensor at a second location within the environment; and
   a device configured to determine a first subset of points in the first frame data that overlap with at least some of the plurality of points of the 3D point cloud in the reference coordinate system and determine a second subset of points in the second frame data that overlap with at least some of the plurality of points of the 3D point cloud in the reference coordinate system for determining a location within the 3D point cloud where the overlapping first subset of points in the first frame data and the overlapping second subset of points in the second frame data was produced, the first frame data being different than the second frame data, thereby localising the transportable apparatus within the environment, wherein the device is configured to obtain a velocity of the transportable apparatus at a specified time, compare the specified time and the velocity to a time that the first frame or the second frame was captured, and verify the location of the transportable apparatus within the 3D point cloud when the specified time and the velocity match the time that the first frame or the second frame was captured.

12. A vehicle including the transportable apparatus according to claim 11.

13. A non-transitory computer program product comprising instructions that when executed by one or more processors causes the one or more processors to perform a process for localising transportable apparatus within an environment, the process comprising:
   obtaining point cloud data representing a 3D point cloud including a plurality of points in a reference coordinate system of at least part of the environment;
   obtaining first frame data representing a first image produced by an imaging sensor on board transportable apparatus at a first location within the environment;
   obtaining second frame data representing a second image produced by the imaging sensor at a second location within the environment;

determining a first subset of points in the first frame data that overlap with at least some of the plurality of points of the 3D point cloud in a reference coordinate system;

determining a second subset of points in the second frame data that overlap with at least some of the plurality of points of the 3D point cloud, the second frame data being different than the first frame data;

determining a location within the 3D point cloud where the overlapping first subset of points in the first frame data and the overlapping second subset of points in the second frame data was produced, thereby localising the transportable apparatus within the environment;

obtaining a velocity of the transportable apparatus at a specified time;

comparing the specified time and the velocity to a time that the first frame or the second frame was captured; and when the specified time and the velocity match the time that the first frame or the second frame was captured, verifying the location of the transportable apparatus within the 3D point cloud.

14. The non-transitory computer program product according to claim 13, wherein determining the location within the 3D point cloud includes finding a minimum of a cost function that maximises similarity of information about appearance of parts of the environment in the first frame data, the second frame data and the overlapping first and second subsets of points in the first and second frame data.

15. The non-transitory computer program product according to claim 14, wherein the cost function comprises a Normalised Information Distance (NID) function.

16. The non-transitory computer program product according to claim 15, wherein determining the location within the 3D point cloud includes modelling the appearance of points in the first frame data, the second frame data and/or the overlapping first and second subsets of points in the first and second frame data as samples from random variables so that the NID cost function produces a measure of similarity between distributions of the variables.

17. The non-transitory computer program product according to claim 16, where a plurality of imaging sensors are provided on board the transportable apparatus and the process further includes:

aligning image data produced by the plurality of imaging sensors;

computing the NID cost function between consecutive frames for each said imaging sensor independently; and summing the NID cost functions over all the imaging sensors to produce a total cost function.

18. The non-transitory computer program product according to claim 17, the process further including blurring the images prior to the aligning of the image data.

19. The non-transitory computer program product according to claim 13, wherein the first frame data and the second frame data, respectively, comprise consecutive images taken over a period of time.

20. The non-transitory computer program product according to claim 13, wherein at least one of:

the 3D point cloud data is generated by a prior survey of the environment;

the imaging sensor comprises a monocular camera; and the appearance information comprises colour values for points in the 3D point cloud.

* * * * *